(12) United States Patent
Sugiura et al.

(10) Patent No.: US 11,679,379 B2
(45) Date of Patent: Jun. 20, 2023

(54) EXHAUST GAS PURIFICATION DEVICE

(71) Applicants: Koji Sugiura, Toyota (JP); Takeshi Hirabayashi, Toyota (JP); Akemi Satou, Toyota (JP); Keisuke Murawaki, Kakegawa (JP); Takaya Ota, Toyota (JP); Masatoshi Ikebe, Kakegawa (JP); Kohei Takasaki, Kakegawa (JP); Takeshi Morishima, Kakegawa (JP)

(72) Inventors: Koji Sugiura, Toyota (JP); Takeshi Hirabayashi, Toyota (JP); Akemi Satou, Toyota (JP); Keisuke Murawaki, Kakegawa (JP); Takaya Ota, Toyota (JP); Masatoshi Ikebe, Kakegawa (JP); Kohei Takasaki, Kakegawa (JP); Takeshi Morishima, Kakegawa (JP)

(73) Assignees: TOYOTA JIDOSHA KABUSHIKI KAISHA, Toyota (JP); CATALER CORPORATION, Kakegawa (JP)

(*) Notice: Subject to any disclaimer, the term of this patent is extended or adjusted under 35 U.S.C. 154(b) by 0 days.

(21) Appl. No.: 17/734,702

(22) Filed: May 2, 2022

(65) Prior Publication Data
US 2022/0370997 A1    Nov. 24, 2022

(30) Foreign Application Priority Data

May 20, 2021    (JP) .............................. JP2021-085542

(51) Int. Cl.
*B01J 35/00*    (2006.01)
*B01J 35/04*    (2006.01)
*F01N 3/28*    (2006.01)
*B01D 53/94*    (2006.01)

(52) U.S. Cl.
CPC .......... *B01J 35/0006* (2013.01); *B01D 53/94* (2013.01); *B01J 35/04* (2013.01); *F01N 3/2828* (2013.01);
(Continued)

(58) Field of Classification Search
CPC ....... B01J 35/0006; B01J 35/04; B01D 53/94; B01D 2255/9022; B01D 2255/9205;
(Continued)

(56) References Cited

U.S. PATENT DOCUMENTS 10,159,934 B2 * 12/2018 Kitamura .............. B01J 37/0248
10,159,935 B2 * 12/2018 Onoe ....................... B01J 35/04
(Continued)

FOREIGN PATENT DOCUMENTS

JP    2020-193569 A    12/2020
JP    2021-143625 A    9/2021
(Continued)

*Primary Examiner* — Tom P Duong
(74) *Attorney, Agent, or Firm* — Oliff PLC (57) ABSTRACT

The exhaust gas purification device includes a substrate, a first catalyst layer, and a second catalyst layer. The substrate includes an upstream end, a downstream end, and a porous partition wall defining a plurality of cells extending between the upstream end and the downstream end. The plurality of cells include an inlet cell opening at the upstream end and sealed at the downstream end, and an outlet cell adjacent to the inlet cell sealed at the upstream end and opening at the downstream end. The first catalyst layer is disposed on a surface of the partition wall in an upstream region. In a downstream region, the second catalyst layer is disposed inside the partition wall, and a second catalyst-containing wall including the partition wall and the second catalyst layer has a porosity of 35% or more.

12 Claims, 4 Drawing Sheets

(52) U.S. Cl.
CPC ............... *B01D 2255/1021* (2013.01); *B01D 2255/1025* (2013.01); *B01D 2255/407* (2013.01); *B01D 2255/9022* (2013.01); *B01D 2255/9205* (2013.01); *F01N 2330/06* (2013.01); *F01N 2330/48* (2013.01); *F01N 2370/02* (2013.01); *F01N 2510/06* (2013.01)

(58) Field of Classification Search
CPC ............... F01N 3/2828; F01N 2330/06; F01N 2330/48; F01N 2370/02; F01N 2510/06
USPC ........................................................ 422/180
See application file for complete search history.

(56) References Cited

U.S. PATENT DOCUMENTS

| | | | | |
|---|---|---|---|---|
| 10,344,655 | B2* | 7/2019 | Onoe | ............... F01N 3/28 |
| 10,814,311 | B2* | 10/2020 | Hoshino | ............... F01N 3/24 |
| 10,926,221 | B2* | 2/2021 | Chen | ............... B01D 53/944 |
| 2017/0304773 | A1* | 10/2017 | Onoe | ............... B01J 37/0244 |
| 2017/0306823 | A1* | 10/2017 | Onoe | ............... B01J 37/0236 |
| 2018/0028972 | A1* | 2/2018 | Kitamura | ............... B01J 37/0248 |
| 2018/0045097 | A1* | 2/2018 | Tang | ............... F01N 3/208 |
| 2018/0111088 | A1* | 4/2018 | Li | ............... B01J 29/763 |
| 2019/0301327 | A1* | 10/2019 | Yoshioka | ............... F01N 3/035 |
| 2020/0368735 | A1 | 11/2020 | Sugiura et al. | |
| 2021/0001315 | A1 | 1/2021 | Kurihara et al. | |
| 2021/0060487 | A1 | 3/2021 | Onoe et al. | |
| 2021/0283589 | A1 | 9/2021 | Sugiura et al. | |

FOREIGN PATENT DOCUMENTS

| | | |
|---|---|---|
| WO | 2019/058948 A1 | 3/2019 |
| WO | 2019/188620 A1 | 10/2019 |

* cited by examiner

EXHAUST GAS PURIFICATION DEVICE

CROSS REFERENCE TO RELATED APPLICATIONS

The present application claims priority from Japanese patent application JP 2021-085542 filed on May 20, 2021, the entire content of which is hereby incorporated by reference into this application.

BACKGROUND

Technical Field

The present disclosure relates to an exhaust gas purification device.

Background Art

An exhaust gas emitted from an internal combustion engine used in a vehicle, such as an automobile, contains a Particulate Matter (PM), which has been known as a cause of air pollution. The exhaust gas also contains harmful components, such as carbon monoxide (CO), hydrocarbon (HC), and nitrogen oxide (NOx). Regulations for emission amounts of them have been tightened every year.

To trap the PM and remove it from the exhaust gas, a particulate filter, such as a diesel particulate filter for diesel engine (DPF) and a gasoline particulate filter for gasoline engine (GPF), is disposed in an exhaust passage of the internal combustion engine. There has been known a particulate filter having what is called a wall-flow structure, in which a porous substrate defines many cells alternately closed at inlets and outlets.

Additionally, to remove the harmful components, such as CO, HC, and NOx contained in the exhaust gas, a noble metal, such as platinum (Pt), palladium (Pd), and rhodium (Rh), has been used as a catalyst.

JP 2020-193569 A discloses an exhaust gas purification device having a wall-flow structure. The exhaust gas purification device in JP 2020-193569 A includes a partition wall that separates cells and has a gas permeation rate in an exhaust gas flow-out side region higher than that in an exhaust gas flow-in side region. According to JP 2020-193569 A, the most of exhaust gas introduced into the exhaust gas purification device passes through the partition wall in the exhaust gas flow-out side region, which reduces a pressure loss and improves purification performance.

SUMMARY

When the exhaust gas purification device traps the PM, the pressure loss of the gas passing through the exhaust gas purification device increases in some cases. The present disclosure provides an exhaust gas purification device with a small pressure loss after the PM is accumulated inside the device.

According to one aspect of the present disclosure, there is provided an exhaust gas purification device including:
a substrate including an upstream end through which an exhaust gas is introduced into the device;
a downstream end through which the exhaust gas is discharged from the device; and
a porous partition wall defining a plurality of cells extending between the upstream end and the downstream end;
a first catalyst layer; and
a second catalyst layer,
wherein the plurality of cells include:
an inlet cell opening at the upstream end and sealed at the downstream end; and
an outlet cell adjacent to the inlet cell with the partition wall interposed between the inlet cell and the outlet cell, the outlet cell being sealed at the upstream end and opening at the downstream end,
wherein the first catalyst layer is disposed on a surface of the partition wall in an upstream region including the upstream end of the substrate, and
wherein, in a downstream region including the downstream end of the substrate, the second catalyst layer is disposed inside the partition wall, and a second catalyst-containing wall including the partition wall and the second catalyst layer has a porosity of 35% or more.

The exhaust gas purification device of the present disclosure exhibits a small pressure loss after a PM is accumulated inside the device.

DETAILED DESCRIPTION

The following will describe embodiments with reference to the drawings as necessary. The present disclosure is not limited to the following embodiments, and can be subjected to various kinds of changes in design without departing from the spirit of the present disclosure described in the claims. In the drawings referred to in the following description, same reference numerals are given to the same members or members having similar functions, and the repeated description may be omitted in some cases. There may be a case where a dimensional ratio in a drawing differs from the actual ratio for convenience of explanation, or a part of the member is omitted in a drawing. In this application, a numerical range expressed using the sign "-" includes respective values described before and after the sign "-" as a lower limit value and an upper limit value.

An exhaust gas purification device 1 having a wall-flow structure illustrated in FIGS. 1 and 2 will be described. The exhaust gas purification device 1 includes a substrate 10, a first catalyst layer 30, and a second catalyst layer 50.

(1) Substrate 10

The substrate 10 includes a cylindrical-shaped frame 11 and a partition wall 12 that partitions an inner space of the frame 11 in a honeycomb shape. The frame 11 and the partition wall 12 may be integrally formed. While the frame 11 of FIG. 1 has the cylindrical shape, the shape is not limited to this, and any shapes, such as an elliptical cylindrical shape and a polygonal cylindrical shape, may be applicable. The partition wall 12 extends between a first end (a first end surface) I and a second end (a second end surface) J of the substrate 10, and defines a plurality of cells extending between the first end I and the second end J. The plurality of cells include first cells 14 and second cells 16. The first cells 14 are open at the first end I, and closed (sealed) at the second end J by sealing portions 70. The second cells 16 are closed at the first end I by the sealing portions 70, and open at the second end J. The first cells 14 and the second cells 16 are disposed adjacent to one another with the partition wall 12 interposed between the first cells 14 and the second cells 16. While the first cells 14 and the second cells 16 may have square-shaped cross-sectional shapes taken along surfaces perpendicular to their extending directions, the respective shapes are not limited to them, and may be any shapes, such as quadrilateral shapes including a parallelogram shape, a rectangular shape, and a trapezoidal shape; a triangular shape; any other polygonal shapes (e.g., a hexagonal shape and an octagonal shape); and a circular shape.

The partition wall 12 is formed of a porous material through which an exhaust gas is passable. The partition wall 12 may be formed of, for example, a ceramic, such as cordierite ($2MgO \cdot 2Al_2O_3 \cdot 5SiO_2$), aluminum titanate, silicon carbide, or mullite, or an alloy (for example, stainless steel). The partition wall 12 made of the porous material includes pores through which the exhaust gas can flow. While the material of the frame 11 is not specifically limited, the frame 11 may be formed of, for example, a material similar to that of the partition wall 12.

Figure 1:
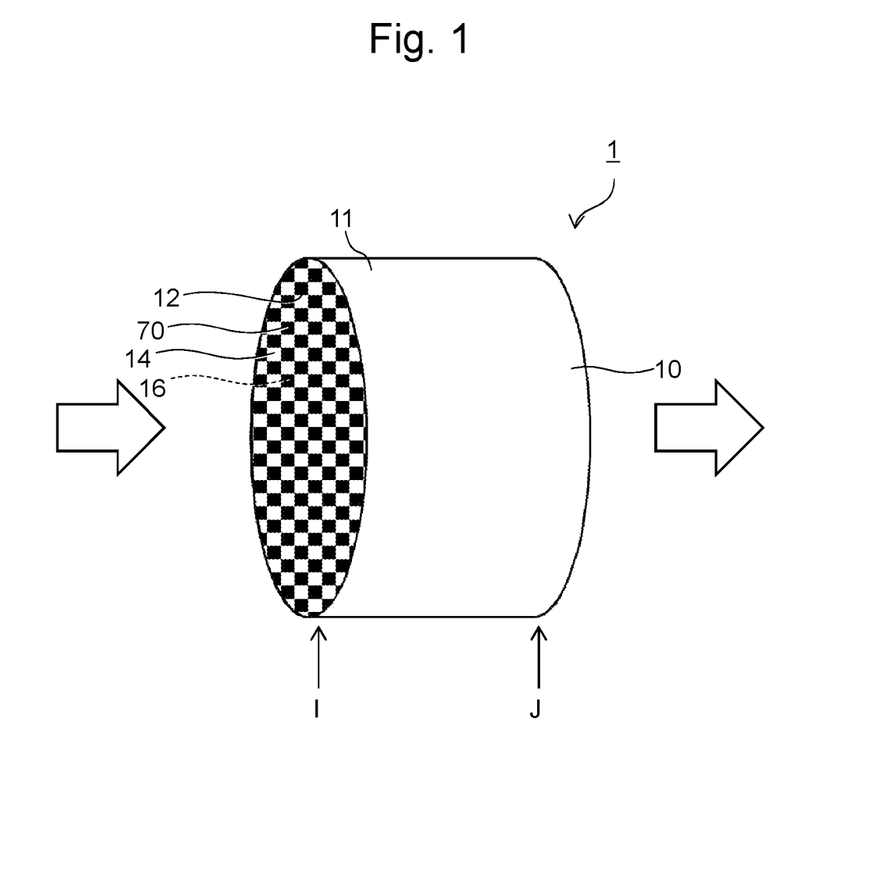
FIG. 1 is a perspective view schematically illustrating an exhaust gas purification device according to an embodiment.

White arrows in FIG. 1 indicate a direction of the exhaust gas introduced into the exhaust gas purification device 1 and discharged from the exhaust gas purification device 1. The exhaust gas that has passed through the first end I into the exhaust gas purification device 1 is discharged from the exhaust gas purification device 1 through the second end J. Therefore, hereinafter, the first end I is also referred to as an upstream end I, and the second end J is also referred to as a downstream end J as appropriate. As indicated by dashed arrows in FIG. 2, the exhaust gas flows through the upstream end I into the first cells 14, passes through the porous partition wall 12 dividing the first cells 14 from the adjacent second cells 16 to flow into the second cells 16, and is discharged from the second cells 16 through the downstream end J. Therefore, the first cell is also referred to as the inlet cell, and the second cell is also referred to as the outlet cell.

(2) First Catalyst Layer 30

The first catalyst layer 30 is disposed on a surface 12a of the partition wall 12 on the inlet cell 14 side (that is, a surface facing the inlet cell 14, which is hereinafter referred to as a "first surface 12a" as appropriate) in a region (herein referred to an "upstream region") X from the upstream end I of the substrate 10 to a first position K, which is distant from the upstream end I by a first distance Dx along the extending direction of the inlet cell 14 and the outlet cell 16 (that is, an extending direction of the partition wall 12 and hereinafter referred to as an "extending direction" as appropriate). That is, the first catalyst layer 30 coats the first surface 12a of the partition wall 12 in the upstream region X. The first catalyst layer 30 need not be disposed in the region other than the upstream region X. The upstream region X is a region having the length Dx in the extending direction and including the upstream end I as one end. The length Dx of the upstream region X in the extending direction may be set as appropriate so as to obtain a desired exhaust gas purification performance, and may be, for example, from 10% to 90% and especially from 10% to 50% of the distance D from the upstream end I to the downstream end J (that is, the length D of the substrate 10 in the extending direction).

In the upstream region X, a first catalyst-coated wall including the partition wall 12 and the first catalyst layer 30 may be impermeable to gas. The first catalyst layer 30 may close the pores in the partition wall 12, thereby allowing the first catalyst-coated wall in the upstream region X to be impermeable to gas. Accordingly, in the upstream region X, the exhaust gas moves along the first catalyst layer 30 in the inlet cell 14 toward a downstream region Y as indicated by the dashed arrows in FIG. 2 while being in contact with the first catalyst layer 30. Note that "impermeable to gas" herein means that it is substantially impossible for a gas to pass through.

The first catalyst layer 30 contains a first metal catalyst. The first metal catalyst may function as a catalyst to oxidize HC or a catalyst to reduce NOx. For example, the first metal catalyst may be one or more selected from the group consisting of platinum (Pt), palladium (Pd), and rhodium (Rh), and especially may be Pt or Pd. The first catalyst layer 30 may further contain other metals such as a noble metal, e.g., ruthenium (Ru), osmium (Os), iridium (Ir), silver (Ag), and gold (Au), an alkali metal, an alkaline earth metal, and a transition metal as long as the function of the first metal catalyst is not impaired.

The first metal catalyst may be supported on carrier particles. The first metal catalyst can be supported on the carrier particles by any supporting method, such as an impregnation supporting method, an adsorption supporting method, and a water-absorption supporting method.

The carrier particles may be oxide particles and especially may be metal oxide particles. More specifically, the carrier particles may be particles of oxide or composite oxide of at least one metal selected from the group consisting of a metal of the group 3, the group 4, and the group 13 in the periodic table of elements and a lanthanoid-based metal, or a mixture of them. Two or more of them may be used in combination. For example, the carrier particles may be at least one oxide or composite oxide of a metal selected from the group consisting of scandium (Sc), yttrium (Y), lanthanum (La), cerium (Ce), neodymium (Nd), samarium (Sm), europium (Eu), lutetium (Lu), titanium (Ti), zirconium (Zr), and aluminum (Al), or a mixture of them. The carrier particles may be particles of at least one oxide or composite oxide of a metal selected from the group consisting of Y, La, Ce, Ti, Zr, and Al, or a mixture of them.

The first catalyst layer 30 may further contain any other components. Examples of any other components include an Oxygen Storage Capacity (OSC) material that occludes oxygen in the atmosphere under oxygen excess atmosphere and releases the oxygen under oxygen deficient atmosphere, a binder, and an additive.

Examples of the OSC material include cerium oxide, a composite oxide containing cerium (for example, composite oxide of Ce and Zr (CZ composite oxide), and composite oxide of Al, Ce, and Zr (ACZ composite oxide)). Two or more of them may be used in combination. Since the CZ composite oxide has a high oxygen storage capacity and is comparatively low-price, the CZ composite oxide may be used as the OSC material. A material produced by further combining the CZ composite oxide with lanthana ($La_2O_3$), yttria ($Y_2O_3$), and the like can be used as the OSC material.

Examples of the binder and the additive include alumina, zirconia, silica ($SiO_2$), magnesia (MgO), titania ($TiO_2$), and a composite of them. Two or more of them may be used in combination.

The first catalyst layer 30 can be disposed on the first surface 12a of the partition wall 12 in the upstream region X through the following illustrative procedure. First, a slurry containing carrier particles supporting the first metal catalyst is prepared. Alternatively, a slurry containing the carrier particles and a precursor of the first metal catalyst may be prepared. The slurry may further contain, for example, the OSC material, the binder, and the additive. The prepared slurry is applied over the first surface 12a of the partition wall 12 in the upstream region X. For example, the substrate 10 is dipped in the slurry from the upstream end I up to a depth corresponding to the first distance Dx, and after a predetermined period has passed, the substrate 10 is pulled up from the slurry, thus allowing the first surface 12a of the partition wall 12 to be coated with the slurry. Alternatively, the slurry may be poured through the upstream end I of the substrate 10 into the inlet cell 14, then the upstream end I may be blown with a blower thereby spreading the slurry toward the downstream end J, thus allowing the first surface 12a of the partition wall 12 to be coated with the slurry. Next, the slurry is dried and sintered at predetermined temperature for a predetermined period. This forms the first catalyst layer 30 on the first surface 12a of the partition wall 12 throughout the upstream region X.

Note that properties of the slurry, such as viscosity and a particle diameter of a solid component, may be adjusted as appropriate such that the first catalyst layer 30 is formed on the first surface 12a of the partition wall 12 in the upstream region X. For example, increasing the particle size of the solid component in the slurry allows forming the first catalyst layer 30 on the first surface 12a of the partition wall 12.

(3) Second Catalyst Layer 50

The second catalyst layer 50 is disposed inside the partition wall 12 in a region (herein referred to as the "downstream region") Y from the downstream end J of the substrate 10 to a second position L, which is distant from the downstream end J by a second distance Dy along the extending direction. The second catalyst layer 50 need not be disposed in a region other than the downstream region Y. The downstream region Y is a region having the length Dy in the extending direction and including the downstream end J as one end. The length Dy of the downstream region Y in the extending direction may be set as appropriate to obtain the desired exhaust gas purification performance, and may be, for example, from 30% to 100% of the distance D from the upstream end I to the downstream end J.

Note that the sum of the length Dx of the upstream region X in the extending direction and the length Dy of the downstream region Y in the extending direction may be equal to or greater than the distance D from the upstream end I to the downstream end J. This allows at least one of the first catalyst layer 30 or the second catalyst layer 50 to be formed on the partition wall 12 or inside the partition wall 12 anywhere throughout the entire region from the upstream end I to the downstream end J, thereby allowing reliable contact of the exhaust gas introduced into the exhaust gas purification device 1 with the first catalyst layer 30 and the second catalyst layer 50 in this order. The sum of the length Dx of the upstream region X in the extending direction and the length Dy of the downstream region Y in the extending direction may be greater than the distance D from the upstream end I to the downstream end J. In this case, the upstream region X overlaps with the downstream region Y. This allows the exhaust gas introduced into the exhaust gas purification device 1 to be brought into contact with the first catalyst layer 30 and the second catalyst layer 50 in this order with more reliability.

"The second catalyst layer 50 is disposed inside the partition wall 12" herein means that the components constituting the second catalyst layer 50 (namely, for example, the catalyst, the carrier, the binder, and the additive) are mainly present inside the partition wall 12 (typically inside the pores in the partition wall 12), not the outside of the partition wall 12 (typically, on the outer surface). Specifically, this means, for example, that 80% or more, 85% or more in some embodiments, 90% or more, 99% or more in some embodiments, or substantially 100% in some embodiments, of the total weight of the components constituting the second catalyst layer 50 is present inside the partition wall 12. Accordingly, the second catalyst layer 50 disposed inside the partition wall 12 is apparently distinct from a penetrated portion of a catalyst layer unintentionally penetrated into the partition wall 12 in an attempt to dispose the catalyst layer on the surface of the partition wall 12.

The components constituting the second catalyst layer 50 may lie on an inner surface of the partition wall 12 surrounding the pores without obstructing all of the pores inside the partition wall 12. This allows the second catalyst-containing wall including the partition wall 12 and the second catalyst layer 50 in the downstream region Y to be permeable to gas. When the downstream region Y overlaps with the upstream region X, the first catalyst layer 30 formed on the first surface 12a of the partition wall 12 possibly blocks the passage of the gas in the overlapping part.

The second catalyst-containing wall including the partition wall 12 and the second catalyst layer 50 has the porosity of 35% or more. The porosity can be measured by obtaining a scanning electron microscope (SEM) image of a cross-section of the second catalyst-containing wall and obtaining a ratio of an area of pores to an area of the second catalyst-containing wall including the area of the pores in the SEM image. As described later in Examples, the porosity of 35% or more allows reducing a pressure loss due to accumulation of the PM inside the exhaust gas purification device 1. The porosity of the second catalyst-containing wall may be 70% or less or may be 60% or less, thereby allowing the second catalyst-containing wall to have a high strength.

The second catalyst layer 50 contains a second metal catalyst. The second metal catalyst may function as a catalyst to oxidize HC or a catalyst to reduce NOx. For example, the second metal catalyst may be one or more selected from the group consisting of platinum (Pt), palladium (Pd), and rhodium (Rh), and especially may be Rh. The second catalyst layer 50 may further contain other metals such as a noble metal, e.g., palladium (Pd), platinum (Pt), ruthenium (Ru), osmium (Os), iridium (Tr), silver (Ag), and gold (Au), an alkali metal, an alkaline earth metal, and a transition metal as long as the function of the second metal catalyst is not impaired.

The second metal catalyst may be supported on carrier particles. The second metal catalyst can be supported on the carrier particles by any supporting method, such as an impregnation supporting method, an adsorption supporting method, and a water-absorption supporting method.

The second catalyst layer 50 may further contain any other components. Examples of any other components include an OSC material that occludes oxygen in the atmosphere under oxygen excess atmosphere and releases the oxygen under oxygen deficient atmosphere, a binder, and an additive.

Examples of the carrier particles, the OSC material, the binder, and the additive are similar to those in the first catalyst layer 30, and therefore the description thereof is omitted.

The second catalyst layer 50 can be disposed inside the partition wall 12 in the downstream region Y through the following illustrative procedure. First, a slurry containing carrier particles supporting the second metal catalyst is prepared. Alternatively, a slurry containing the carrier particles and a precursor of the second metal catalyst may be prepared. The slurry may further contain, for example, the OSC material, the binder, and the additive. The prepared slurry is infiltrated into the partition wall 12 in the downstream region Y. For example, the substrate 10 is dipped in the slurry from the downstream end J up to a depth corresponding to the second distance Dy, and after a predetermined period has passed, the substrate 10 is pulled up from the slurry, thus allowing the slurry to be infiltrated into the partition wall 12. Next, the slurry is dried and sintered at predetermined temperature for a predetermined period. This forms the second catalyst layer 50 inside the partition wall 12 throughout the downstream region Y.

Note that properties of the slurry, such as viscosity and a particle diameter of a solid component, may be adjusted as appropriate such that the second catalyst layer 50 is formed inside the partition wall 12 in the downstream region Y. For example, decreasing the particle size of the solid component in the slurry allows forming the second catalyst layer 50 inside the partition wall 12 without obstructing the pores in the partition wall 12.

Figure 2:
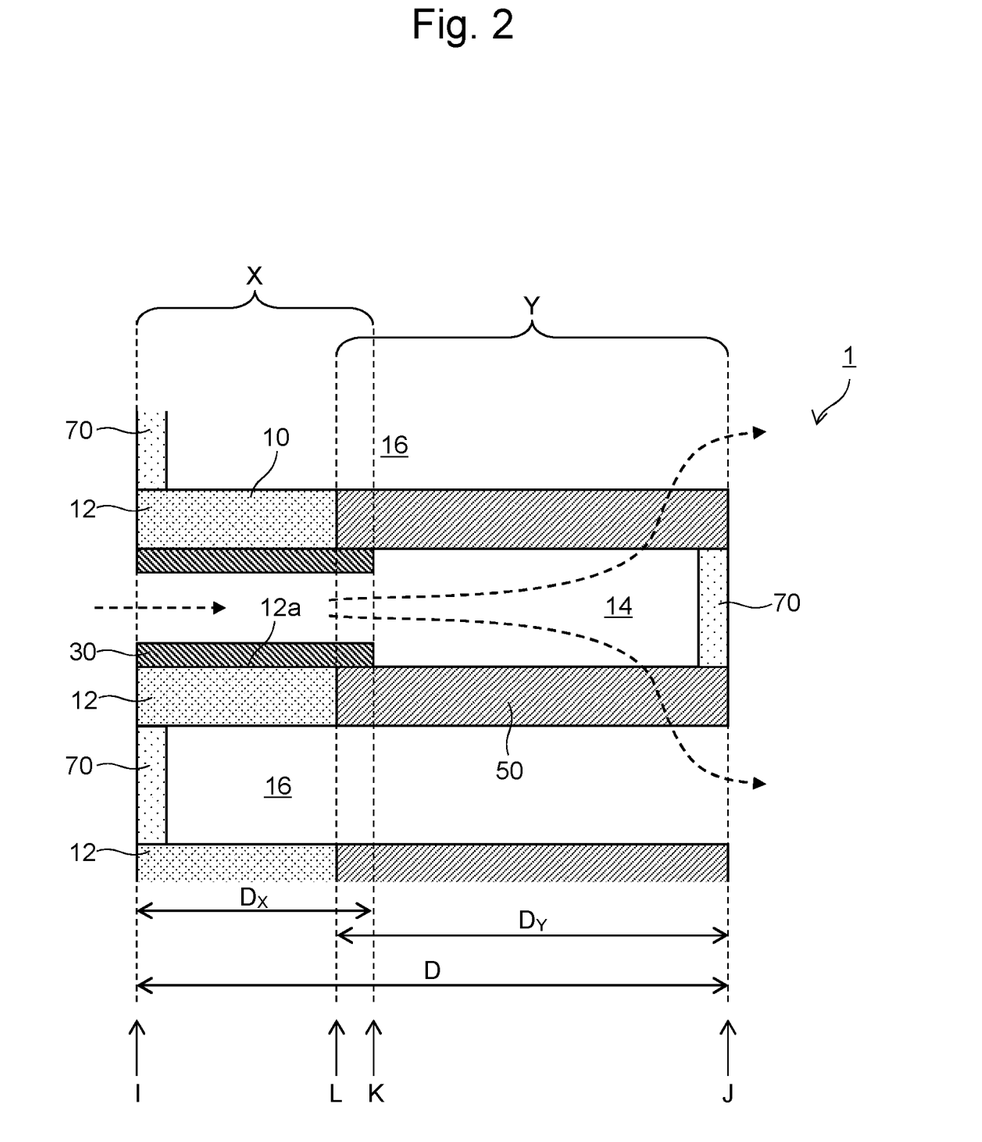
FIG. 2 is an enlarged end view of the main part of the exhaust gas purification device according to the embodiment taken along a surface parallel to an extending direction of cells, and schematically illustrating a configuration at a proximity of a partition wall.

As indicated by the dashed arrows in FIG. 2, the exhaust gas introduced into the exhaust gas purification device 1 according to the embodiment passes through the upstream end I of the substrate 10 into the inlet cell 14. In the upstream region X, the exhaust gas moves inside the inlet cell 14 toward the downstream region Y along the first catalyst layer 30, during which the exhaust gas is in contact with the first catalyst layer 30, and an amount of the harmful components in the exhaust gas is reduced owing to an action of the first metal catalyst contained in the first catalyst layer 30. Next, in the downstream region Y, the exhaust gas passes through the inside of the partition wall 12 into the outlet cell 16, during which the PM in the exhaust gas is trapped on the surface of the partition wall 12 and inside the pores. Additionally, the exhaust gas is in contact with the second catalyst layer 50 inside the partition wall 12, and the amount of harmful components in the exhaust gas is further reduced owing to an action of the second metal catalyst contained in the second catalyst layer 50. The exhaust gas having flowed into the outlet cell 16 in the downstream region Y moves inside the outlet cell 16 toward the downstream end J along the partition wall 12, and passes through the downstream end J to be discharged to outside the exhaust gas purification device 1.

The exhaust gas purification device 1 is applicable to various kinds of vehicles with an internal combustion engine. The exhaust gas purification device 1 can be used as a start-up converter (S/C) disposed immediately downstream of the internal combustion engine in a flow direction of exhaust gas or an underfloor converter (UF/C) disposed downstream of the S/C in the flow direction of exhaust gas.

While the embodiments of the present disclosure have been described in detail, the present disclosure is not limited to the embodiments, and various changes are possible within the scope of not departing from the spirit of the present disclosure described in the claims.

EXAMPLES

The following will specifically describe the present disclosure with the examples, but the present disclosure is not limited to these examples.

(1) Manufacture of Exhaust Gas Purification Device

Examples 1 and 2 and Comparative Examples 1 and 2

A substrate having a wall-flow structure made of cordierite was prepared. Dimensions and a structure of the substrate were as follows.

Outer diameter of the substrate: 117 mm
Length of the substrate in an extending direction of a cell: 122 mm
Thickness of a partition wall: about 200 μm
Cell density: 300 pieces per square inch
Pt was supported on carrier powder. The obtained powder, ceria powder, and ion exchanged water were mixed to prepare a first catalyst slurry.

Rh was supported on powder of ceria-zirconia composite oxide (CZ composite oxide) to prepare Rh-supporting CZ composite oxide powder. The obtained powder, alumina powder, and ion exchanged water were mixed to prepare a second catalyst slurry.

The second catalyst slurry containing the Rh-supporting CZ composite oxide powder and the alumina powder by the amounts described in Table 1 was provided to outlet cells through the downstream end of the substrate to be infiltrated into an inside of the partition wall. Next, the second catalyst slurry was dried and sintered. Thus, a second catalyst layer was formed inside the partition wall. That is, a second catalyst-containing wall including the partition wall and the second catalyst layer was formed. The second catalyst layer was formed in a region (a downstream region) from the downstream end of the substrate to a position distant from the downstream end toward the upstream end of the substrate by a distance of 70% of the length of the substrate in the extending direction.

The first catalyst slurry (including 29.24 g of solid content) was provided to inlet cells through the upstream end of the substrate, thereby forming a layer of the first catalyst slurry on the surface of the partition wall facing the inlet cell. Next, the first catalyst slurry was dried and sintered. Thus, a first catalyst layer was formed on the surface of the partition wall facing the inlet cell. The first catalyst layer was formed in a region (an upstream region) from the upstream end of the substrate to a position distant from the upstream end toward the downstream end of the substrate by a distance of 50% of the length of the substrate in the extending direction. Thus, an exhaust gas purification device was manufactured.

Example 3

Except that CZ composite oxide powder having a specific surface area smaller than that of the CZ composite oxide powder used in Example 1 was used, an exhaust gas purification device was manufactured similarly to Example 1.

(2) Measurement of Porosity

A cross-section of the second catalyst-containing wall at a position apart from the downstream end of the substrate by 15 mm was observed with a scanning electron microscope (SEM). From the SEM image, a ratio of an area of pores to an area of the second catalyst-containing wall including the area of the pores, that is, a porosity of the second catalyst-containing wall, was obtained. Table 1 shows the results.

(3) Evaluation for Initial Pressure Loss

Figure 3:
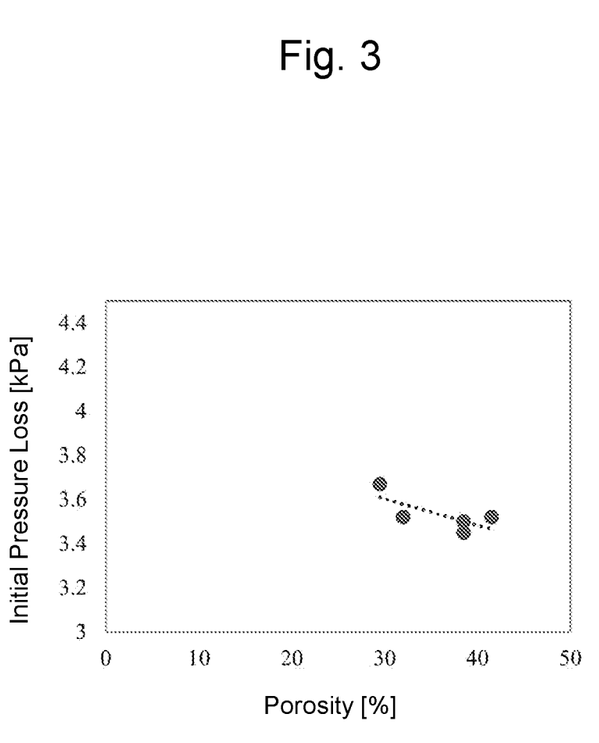
FIG. 3 is a graph showing a relationship between a porosity of a second catalyst-containing wall and an initial pressure loss.

An air was caused to pass through the exhaust gas purification device to measure an initial pressure loss of the exhaust gas purification device. Specifically, the air at 25° C. was introduced into the exhaust gas purification device through the upstream end at a flow rate of 7 $m^3$/minute and discharged through the downstream end. A pressure of the air at the upstream end and a pressure of the air at the downstream end were measured and a difference between these pressures was calculated to obtain the initial pressure loss. Table 1 and FIG. 3 show the results. A remarkable difference in the initial pressure loss was not observed in the examples and the comparative examples. Additionally, a clear correlation was not observed between the porosity of the second catalyst-containing wall and the initial pressure loss.

(4) Measurement of Pressure Loss After PM Accumulation

Figure 4:
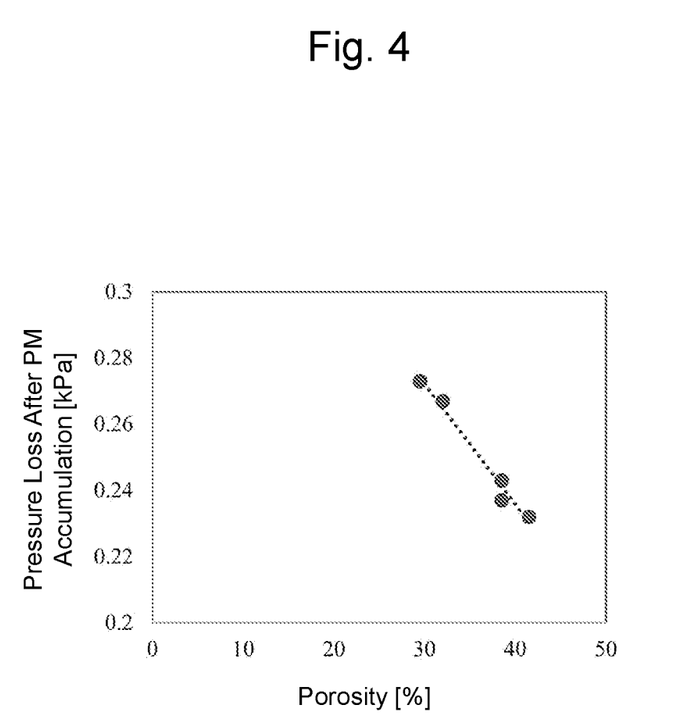
FIG. 4 is a graph showing a relationship between the porosity of the second catalyst-containing wall and a pressure loss after PM accumulation.

Each of the exhaust gas purification devices of the examples and the comparative examples was connected to an exhaust system of a diesel engine bench, and an exhaust gas was caused to pass through each of the exhaust gas purification devices. When 3.9 g of the PM was accumulated on the exhaust gas purification device, a pressure of the exhaust gas at the upstream end and a pressure of the exhaust gas at the downstream end were measured. A difference between these pressures was divided by a flow rate (g/s) of the exhaust gas to obtain the value of the pressure loss after PM accumulation. Table 1 and FIG. 4 show the results. As illustrated in FIG. 4, the pressure loss after PM accumulation depended on the porosity of the second catalyst-containing wall. The exhaust gas purification devices of Examples 1 to 3 in which the porosities of the second catalyst-containing walls were 35% or more exhibited the low pressure loss after PM accumulation.

TABLE 1

| | Second Catalyst Layer | | | | |
| --- | --- | --- | --- | --- | --- |
| | Catalyst-Supporting CZ Composite Oxide Powder [g] | Alumina Powder [g] | Porosity [%] | Initial Pressure Loss [kPa] | Pressure Loss After PM Accumulation [kPa · g$^{-1}$ · s] |
| Comparative Example 1 | 77.08 | 20.25 | 32.0 | 3.52 | 0.267 |
| Example 1 | 63.70 | 20.25 | 38.5 | 3.45 | 0.243 |
| Comparative Example 2 | 77.08 | 24.71 | 29.5 | 3.67 | 0.273 |
| Example 2 | 77.08 | 15.79 | 41.5 | 3.52 | 0.232 |
| Example 3 | 77.08 | 20.25 | 38.5 | 3.50 | 0.237 |

What is claimed is:

1. An exhaust gas purification device comprising:
    a substrate including:
        an upstream end through which an exhaust gas is introduced into the device;
        a downstream end through which the exhaust gas is discharged from the device; and
        a porous partition wall defining a plurality of cells extending between the upstream end and the downstream end;
    a first catalyst layer; and
    a second catalyst layer,
    wherein the plurality of cells include:
        an inlet cell opening at the upstream end and sealed at the downstream end; and
        an outlet cell adjacent to the inlet cell with the partition wall interposed between the inlet cell and the outlet cell, the outlet cell being sealed at the upstream end and opening at the downstream end,
    wherein the first catalyst layer is disposed on a surface of the partition wall in an upstream region including the upstream end of the substrate,
    wherein, in a downstream region including the downstream end of the substrate, the second catalyst layer is disposed inside the partition wall, and a second catalyst-containing wall including the partition wall and the second catalyst layer has a porosity of 35% or more.

2. The exhaust gas purification device according to claim 1,
    wherein the upstream region overlaps with the downstream region.

3. The exhaust gas purification device according to claim 1,
    wherein the length of the first catalyst layer Dx is from 10% to 90% of the distance D in an extending direction from the upstream end I to the downstream end J.

4. The exhaust gas purification device according to claim 3,
    wherein the length of the first catalyst layer Dx is from 10% to 50% of the distance D.

5. The exhaust gas purification device according to claim 1,
    wherein the length of the second catalyst layer Dy is from 30% to 100% of the distance D in an extending direction from the upstream end I to the downstream end J.

6. The exhaust gas purification device according to claim 1,
    wherein the upstream region and the downstream region overlap in an extending direction.

7. The exhaust gas purification device according to claim 1,
    wherein the components constituting the second catalyst layer are present inside the partition wall in a total weight amount of 80% or more.

8. The exhaust gas purification device according to claim 7,
    wherein the total weight amount is 85% or more.

9. The exhaust gas purification device according to claim 7,
    wherein the total weight amount is 90% or more.

10. The exhaust gas purification device according to claim 7,
    wherein the total weight amount is 99% or more.

11. The exhaust gas purification device according to claim 7,
    wherein the total weight amount is substantially 100%.

12. The exhaust gas purification device according to claim 1,
    wherein, in the upstream region, a first catalyst-coated wall including the partition wall and the first catalyst layer is impermeable to gas.

\* \* \* \* \*